United States Patent [19]

Irimajiri et al.

[11] Patent Number: 4,502,434
[45] Date of Patent: Mar. 5, 1985

[54] INTERNAL COMBUSTION ENGINE

[75] Inventors: Shoichiro Irimajiri, Saitama; Takeo Fukui, Tokyo, both of Japan

[73] Assignee: Honda Giken Kogyo Kabushiki Kaisha, Tokyo, Japan

[21] Appl. No.: 430,847

[22] Filed: Sep. 30, 1982

Related U.S. Application Data

[60] Division of Ser. No. 188,477, Sep. 18, 1980, Pat. No. 4,383,508, which is a continuation-in-part of Ser. No. 22,801, Mar. 22, 1979, abandoned.

[30] Foreign Application Priority Data

Mar. 30, 1978 [JP] Japan .................................. 53-40106

[51] Int. Cl.³ ............................................... F02F 3/28
[52] U.S. Cl. .................................. 123/193 P; 92/177; 123/197 AB
[58] Field of Search ................... 123/193 P, 52 B, 197; 92/177; 308/179

[56] References Cited

U.S. PATENT DOCUMENTS 2,145,864 2/1939 Denneen et al. ..................... 308/179
3,046,954 7/1962 Hoffman et al. ................ 123/195 R
4,285,304 8/1981 Bachmann .......................... 123/52 B

FOREIGN PATENT DOCUMENTS 0142516 5/1920 United Kingdom .

Primary Examiner—Craig R. Feinberg
Attorney, Agent, or Firm—Lyon & Lyon

[57] ABSTRACT

An engine employing oval pistons and cylinders with dual connecting rods for each piston. The connecting rods are connected to each piston by a common wrist pin and to a composite crankshaft. The crankshaft includes a main bearing between the connecting rods of each of the pistons. It also includes a middle portion associated with each piston including two crank pins and the shaft therebetween for receipt of the centrally located main bearing.

1 Claim, 2 Drawing Figures

INTERNAL COMBUSTION ENGINE

This is a division of application Ser. No. 188,477, filed Sept. 18, 1980, now U.S. Pat. No. 4,383,508, which is a continuation in part of co-pending application, Ser. No. 22,801, filed Mar. 22, 1979 and entitled Connecting Ros for Oblong Piston for Internal Combustion Engine now abandoned.

BACKGROUND OF THE INVENTION

The present invention is directed to internal combustion engines and more particularly to internal combustion engines having oblong cylinders.

Internal combustion engines have been developed which employ engine cylinders which are not circular in cross-section. These cylinders have been elliptical in the true mathematical sense, oblong and broadly elliptical or oval. In describing such cylinders, the term "oval" will be used to cover rounded cross-sections which are other than circular and which may be truly elliptical or broadly elliptical, e.g. having rounded ends and straight sides. In most cases, engines employing these piston and cylinder configurations were developed as a means for effecting a reduced external dimension of the engine in question without reducing its overall displacement. A variety of configurations have been developed with the long dimension of the engine cylinders both parallel and perpendicular to the crankshaft and one such design has employed two connecting rods associated with the piston for coupling with the crankshaft (British Pat. No. 142,516).

The present invention is associated with the development of an oval piston internal combustion engine which is designed for relatively high speed operation. The engine employs a valve configuration which, for volumetric and fluid dynamic reasons (see co-pending application Ser. No. 91,837 filed Nov. 6, 1979), enables productive speeds on the order of 19,000 RPM. With speeds approaching 20,000 RPM, a variety of special conditions must be considered. Among these, friction and internal forces become increasingly important factors in realizing efficient and reliable engine operation. The large inertial effects on the pistons, connecting rods and crankshaft associated with such high speed operation can cause detrimental vibrational effects, particularly in the crankshaft. Principal load requirements on the crankshaft also become more and more imposing with increased engine RPM. The piston may also take on unusual motions at higher RPM's.

The normal practice responsive to increased forces is to simply strengthen the components. To this end, a larger crankshaft diameter would normally be warrented. The same is true of the connecting rod associated with the piston. However, these normal practices find disadvantage in the increased inertia and the increased friction resulting from the increase in engine speed.

The friction of a rotating bearing increases roughly as a power of 1 to 1½ of the diameter of the bearing. As greater inertial loads are placed on the crankshaft and connecting rods, greater diameters would normally be employed to resist direct and vibrational loadings. With the increases in crankshaft diameter, friction is rapidly increased. The added inertia also results in greater structural requirements throughout the engine if reliability is to be maintained. Thus, designs employing a substantially strengthened crankshaft and connecting rods have proved to negate some of the power advantages achieved by the unusual engine design.

SUMMARY OF THE INVENTION

The present invention is directed to improvements in internal combustion engines particularly of the type having engine cylinders which are oval in cross-section. Particular attention is directed to the drive train of the engine associated with the piston to minimize frictional losses and inertial loading. To this end, dual connecting rods are employed with each oval piston. These connecting rods are associated with a crankshaft which has a main bearing for rotatably mounting the shaft to the engine structure between the dual connecting rods associated with each piston. Through this arrangement, smaller crankshaft components, smaller connecting rods and integrally formed connecting rods become practical with attendant reductions in friction loss and excessive inertial forces.

Accordingly, it is an object of the present invention to provide an improved internal combustion engine including cylinders and pistons, oval in cross-section.

It is another object of the present invention to provide an improved engine drive train for pistons in an internal combustion engine wherein the pistons and cylinders thereof are oval in cross-section.

Other and further objects and advantages will appear hereinafter.

DETAILED DESCRIPTION OF THE PREFERRED EMBODIMENT

Figure 1:
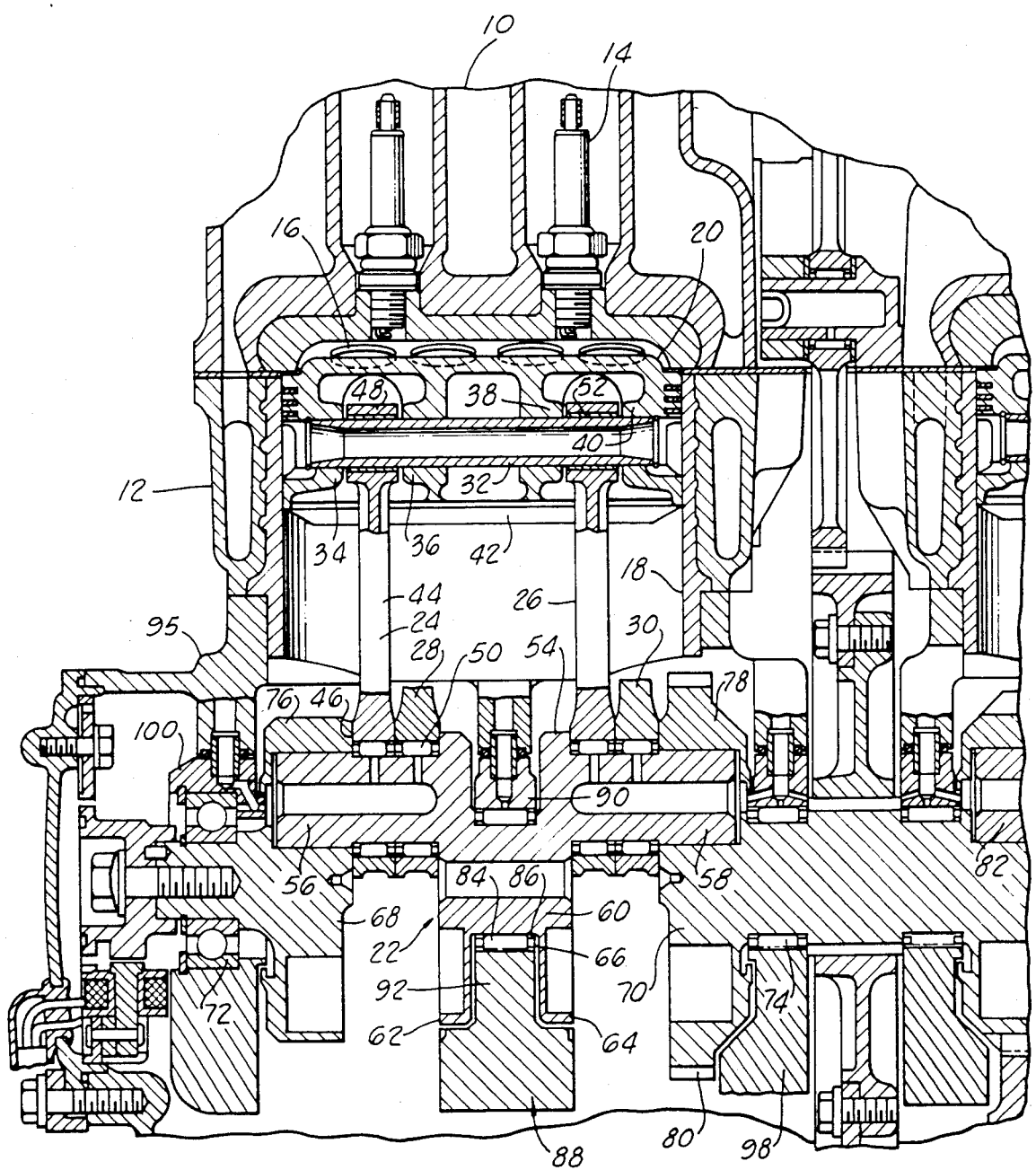
FIG. 1 is a cross-sectional elevation of an engine incorporating the present invention.
Figure 2:
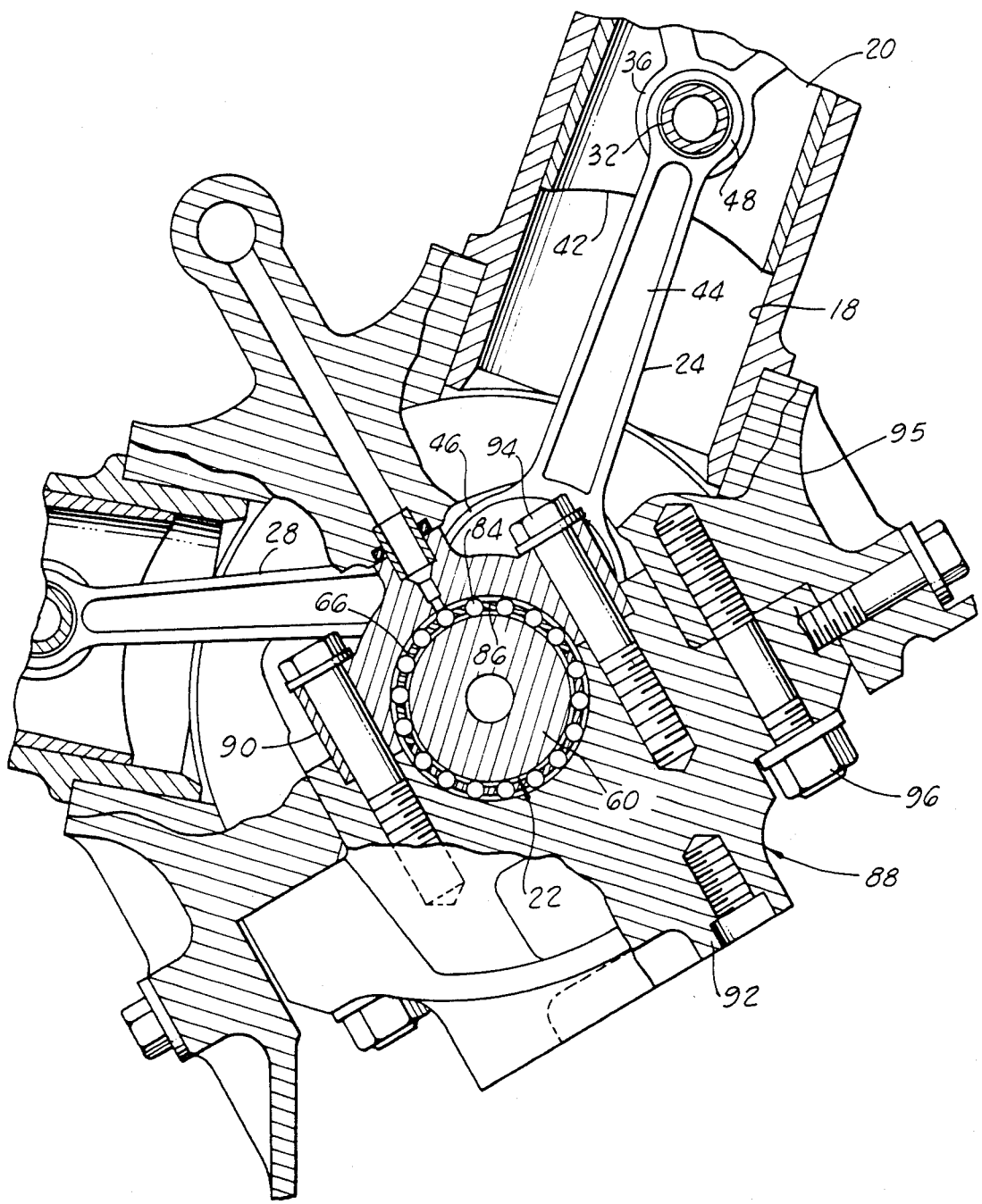
FIG. 2 is a cross-sectional side view of the embodiment of FIG. 1.

Turning in detail to the drawings, a portion of an engine is disclosed including a head 10 and a cylinder block 12. The engine illustrated forms a portion of a V-4 cylinder motorcycle engine. The cylinder head associated with this particular model includes two spark plugs 14 and four intake and four exhaust valves 16. The bore of each engine cylinder 18 is generally oval in cross-section. In this preferred embodiment, the cylinder cross-section is defined by two straight side sections and two semi-circular end sections. A piston 20 also exhibits an oval cross-section and is designed to move with sliding contact within the bore of the cylinder 18 in conventional fashion.

Located below the piston 20, a crankshaft, generally designated 22, is rotatably mounted relative to the cylinder block 12. Connecting rod means extend between each piston 20 and the crankshaft 22.

To properly constrain the motion of each piston 20 in its cylinder 18, the connecting rod means includes two connecting rods 24 and 26. For clarity, the connecting rods associated with the piston in front of the piston 20 shown in FIG. 1 are separately labeled 28 and 30. Substantial advantage is provided by the use of dual connecting rods for each piston. By placing the connecting rods 24 and 26 outwardly toward the outer extremeties of the piston 20, maximum angular control of the piston is effected with a minimum of inertial mass. Naturally, bending moments experienced by all associated components are also reduced.

The two connecting rods 24 and 26 are pivotally fixed to the piston 20 by means of a wrist pin or piston pin 32. A single wrist pin 32 is employed to hold both of the connecting rods 24 and 26 in place. At the same time, piston bosses 34 and 36 individually locate and support the mounting of the connecting rod 24 while piston bosses 38 and 40 accomplish the same result for the other connecting rod 26. A central space is provided between the bosses 36 and 38 as a means for the reduction of inertial mass. The wrist pin 32 is held in a common bore extending through the piston bosses 34–40 by conventional spring clip means. Furthermore, the bosses 34 and 40 are formed in common with the piston skirt 42.

Each connecting rod 24–30 includes a central rod 44, a crank pin journal box 46 and a wrist pin journal box 48. These elements of each connecting rod are integrally formed to minimize inertial mass. The crank pin journal box 46 is associated with the crankshaft 22 about a crank pin thereof with a roller bearing 50 employed for reduced friction. The wrist pin journal box 48 is held in place by the wrist pin 32 and uses a bushing 52 to reduce friction.

The crankshaft 22 is a composit structure defined in part by a middle crank portion 54 including two crank pins 56 and 58 and a middle shaft 60. The crank pin 56, the middle shaft 60 and the crank pin 58 are positioned in seriatim and adjacent, being tied together by crank webs 62 and 64. The middle shaft 60 is concentric with the axis of rotation of the crankshaft 22 to receive a main bearing 66. The connecting rods 24–30 are positioned on the crank pins 56 and 58 prior to assembly. The location of the main bearing 66 between these crank pins 56 and 58 thus places the main bearing 66 between connecting rods associated with the same piston. This effectively and greatly reduces the bending moments placed on the crankshaft 22.

Outwardly of the middle crankshaft portion 54 are additional crankshaft elements 68 and 70. These additional crankshaft elements 68 and 70 provide additional shaft portions to receive conventionally placed main bearings 72 and 74. Crank webs 76 and 78 receive the outer portions of the crank pins 56 and 58 in holes designed to provide an interference fit with the crank pins. Additional portions of the crankshaft 22, not of immediate concern, include power take-off means 80 and an additional middle crank portion 82 where desired for additional pistons.

The crankshaft 22 is held in place as indicated by main bearings 72 and 74 on either side of the middle crank portion 54 and by main bearing 66 located about the middle shaft 60 between crank pins 56 and 58. The main bearing 66 is a roller bearing having rollers 84 and a roller cage 86. The roller cage is split diametrically for assembly. The journal box, generally designated 88 associated with the main bearing 66 includes a first section 90 and a second section 92. Together the first and second sections 90 and 92 define a journal cavity which also acts as the outer race for the rollers 84. The first section 90 is not held by means of fasteners to the crankcase. Rather, the first section 90 is held by fasteners 94 to the second section 92. The second section 92 is in turn fastened to the crankcase 95 portion of the block 12 by means of fasteners 96. The same general construction is applied to the journal box 98 for the main bearing 74. The main bearing 72 may employ either a unitary or split journal box 100 as access is available from the end of the shaft. Assembly of the journal box components with the bearings and crankshaft are accomplished by placing the split roller bearings into position and bolting the first section 90 to the second section 92. This assembly of the crankshaft 22 and the journal boxes 88, 98 and 100 may then be positioned in the bottom portion of the engine and bolted to the engine by means of the fasteners 96. As the connecting rods were placed onto the crankshaft prior to assembly, they would also be associated with the crankshaft 22 during its placement in the engine.

Thus, an improved design associated with oval piston and cylinder configurations is here described to particularly enhance the efficiency and reliability of high performance engines. While embodiments and applications of this invention have been shown and described, it would be apparent to those skilled in the art that many more modifications are possible without departing from the inventive concepts herein described. The invention, therefore, is not to be restrictive except by the spirit of the appended claims.

What is claimed is:

1. An internal combustion engine conprising
an oval engine cylinder;
an oval piston mounted to reciprocate in sliding contact with said oval engine cylinder;
a crankshaft extending parallel to the major dimension of said piston having an axis of rotation;
two connecting rods extending between said piston and said crankshaft;
bearings rotatably supporting said crankshaft relative to said oval engine cylinder, a first one of said bearings being between said two connecting rods;
a crankcase fixed relative to said oval engine cylinder;
a journal box rotatably supporting said first bearing, said journal box including a first section, a second section, first fasteners and second fasteners, said two sections each defining one half of the journal cavity in which said first bearing is positioned, said first section being fixed by said first fasteners to said second section and said second section being fixed by said second fasteners to said crankcase, said second section being on the other side of said crankshaft from said oval engine cylinder; and
wherein said first bearing is a roller bearing including rollers and a roller cage and coaxially aligned with said axis of rotation, said cage being diametrically split.

* * * * *